United States Patent [19]

Zunker

[11] Patent Number: 4,495,245

[45] Date of Patent: Jan. 22, 1985

[54] INORGANIC FILLERS MODIFIED WITH VINYL ALCOHOL POLYMER AND CATIONIC MELAMINE-FORMALDEHYDE RESIN

[75] Inventor: David W. Zunker, Wilmington, Del.

[73] Assignee: E. I. Du Pont de Nemours and Company, Wilmington, Del.

[21] Appl. No.: 513,879

[22] Filed: Jul. 14, 1983

[51] Int. Cl.³ .................. B32B 27/20; B32B 5/16; C08K 9/00; C08K 9/04

[52] U.S. Cl. .................. 428/403; 428/404; 428/407; 523/206; 524/425; 524/446; 524/501; 524/503

[58] Field of Search ............ 428/402, 403, 404, 407; 524/501, 503, 49; 523/206

[56] References Cited

U.S. PATENT DOCUMENTS

| | | | |
|---|---|---|---|
| 2,328,057 | 8/1943 | Coulter | 524/503 |
| 3,437,034 | 4/1969 | Otto et al. | 427/395 |
| 3,458,465 | 7/1969 | Rehnelt et al. | 524/503 |
| 3,630,831 | 12/1971 | Jongetjes | 528/58 |
| 4,094,718 | 6/1978 | Czerwin | 524/52 |
| 4,258,103 | 3/1981 | Hosmer et al. | 428/342 |
| 4,293,378 | 10/1981 | Klein | 55/527 |

FOREIGN PATENT DOCUMENTS 551950 3/1943 United Kingdom.

OTHER PUBLICATIONS

Derwent Abst. 05957 D/05, Jan. 1981, (DE 3024257).
Derwent Abst. 03710 B/02, Feb. 1978, (SU 594-151).

*Primary Examiner*—Herbert J. Lilling

[57] ABSTRACT

Modified fillers prepared by contacting inert, particulate, mineral fillers with aqueous solution of vinyl alcohol polymer and aqueous colloidal dispersion of cationic melamine-formaldehyde resin to obtain a filler having adsorbed thereon from about 0.1 to about 3 percent, based on dry filler weight, of each of vinyl alcohol polymer and cationic melamine-formaldehyde resin are provided. Such modified fillers are useful in papermaking.

10 Claims, No Drawings

INORGANIC FILLERS MODIFIED WITH VINYL ALCOHOL POLYMER AND CATIONIC MELAMINE-FORMALDEHYDE RESIN

BACKGROUND OF THE INVENTION

1. Field of the Invention

This invention relates to fillers and more specifically it relates to fillers modified with polyvinyl alcohol and cationic melamine-formaldehyde resin.

2. Description of the Prior Art

U.S. Pat. No. 4,258,103 discloses a coating used in the preparation of a decorative heat and pressure consolidated laminate wherein the coating comprises an inert filler, a non-thermoplastic adhesive (for example, polyvinyl alcohol) and a water soluble thermosetting resin selected from the class consisting of urea-formaldehyde resin condensates and melamine-formaldehyde resin condensates. The melamine-formaldehyde resins described in this patent are not cationic.

It is known that polyvinyl alcohol by itself does adsorb onto mineral filler surfaces to some extent ("Polyvinyl Alcohol Properties and Applications," Chapter 13, pp. 331-338, John Wiley & Sons, 1973). Clay, for example, commonly is used in conjunction with polyvinyl alcohol as a binder for coatings for paper substrates. The reference also shows that much of the polyvinyl alcohol charged in such a system often remains unadsorbed and is wasted in the water phase.

SUMMARY OF THE INVENTION

According to the present invention there is provided a modified filler prepared by contacting inert, particulate, mineral filler with aqueous solution of vinyl alcohol polymer and aqueous colloidal dispersion of cationic melamine-formaldehyde resin sequentially, in either order, or concurrently in one step by use of preformed aqueous vinyl alcohol polymer/cationic melamine-formaldehyde interaction product, the ratio of vinyl alcohol polymer to cationic melamine-formaldehyde resin being from about 0.3:1 to about 8:1, at a temperature of up to about 100° C. for a period of from about 1 minute to about 1 hour, to obtain a filler having adsorbed thereon from about 0.01 to about 3%, based on dry filler weight, of each of vinyl alcohol polymer and cationic melamine-formaldehyde resin.

DETAILED DESCRIPTION OF THE INVENTION

The present invention consists of a new composition of matter, comprising an inorganic filler which has its surface modified with vinyl alcohol polymer and with a cationic melamine-formaldehyde resin. The product is formed by adsorption of, for example, polyvinyl alcohol and a cationic melamine-formaldehyde resin from aqueous medium onto the surface of a filler. Adsorption of the two modifying components onto a filler surface may be sequential, in either order, or may be concurrent through use of a preformed polyvinyl alcohol/cationic melamine-formaldehyde interaction product. The extent of adsorption of polyvinyl alcohol onto a filler surface is enhanced by cotreatment with a cationic melamine-formaldehyde resin. A filler with its surface modified with polyvinyl alcohol and a melamine-formaldehyde resin exhibits an interface between it and a subsequently filled matrix which is different from an unmodified filler interface with the same matrix.

The present invention represents a new way to incorporate vinyl alcohol polymer together with its polymeric strength and adhesive properties into filled materials. Inorganic fillers which have had their surfaces modified with polyvinyl alcohol and a cationic melamine-formaldehyde resin are useful in papermaking. Such fillers represent a new means for incorporating vinyl alcohol polymer as a strengthening agent within the paper structure. Fillers lower the cost of paper, but they also normally weaken paper. Fillers modified with vinyl alcohol polymer and a cationic melamine-formaldehyde resin can be used both to achieve lower paper cost and to regain some or all of the normal loss in paper strength properties associated with fillers. The modified fillers also provide a new way to incorporate cationic melamine-formaldehyde wet-strength resin into paper.

The inorganic fillers of the present invention are inert, particulate minerals, commonly called "mineral fillers", as described in "Encyclopedia of Polymer Science and Technology", Volume 6, pp. 740-750, John Wiley and Sons, 1967. They may be in the general form of platelets, crystallites, powders, an spheres. For more or less spherically shaped fillers the average particle diameters generally range from about 0.015 to 15 micrometers, with the diameter of the largest particle being no larger than about 45 micrometers. For non-spherical particles, such as platelets, the average largest dimension also generally ranges from about 0.015 to 15 micrometers, with the largest dimension of the largest particle generally being no larger than about 45 micrometers.

Typical fillers include silicates, such as clay, talc, wollastonite, and precipitated calcium silicate; oxides, such as aluminum oxide, silica, and titanium dioxide; carbonates, such as precipitated and ground calcium carbonates; and sulfates, such as barium sulfate and calcium sulfate.

Preferred fillers of this invention for papermaking applications are clay and calcium carbonate, which are two of the fillers most commonly used in that industry.

The vinyl alcohol polymer component of this invention can be a "completely" hydrolyzed grade (about 99 to 100 mole percent hydrolysis of acetate groups), a partially hydrolyzed grade (about 80-90% hydrolysis), a polymer of intermediate level of hydrolysis, or blends thereof. The vinyl alcohol polymer should have a degree of polymerization from about 500 to about 3000. This approximately corresponds to a solution viscosity (4% aqueous, 20° C., Hoeppler falling ball method) of from about 5 to about 100 MPa·s for commercial grades of polyvinyl alcohol.

The vinyl alcohol polymer component of this invention can be polyvinyl alcohol or it also can be a copolymer of vinyl alcohol, and up to about 15 mole percent of comonomer selected from the group consisting of β-olefins having 2 to 18 carbon atoms, vinyl esters of saturated carboxylic acids wherein the acid moiety has up to 18 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, N-substituted amides of unsaturated monocarboxylic acids, allyl alcohol, allyl esters of saturated carboxylic acids wherein the acid moiety has up to 18 carbon atoms and vinyl halides. Suitable comonomers include esters of acrylic, methacrylic, maleic, fumaric, and itaconic acids; α-olefins, such as ethylene, propylene, and octadecene;

higher vinyl esters, such as vinyl butyrate, 2-ethyl hexoate, and stearate; N-substituted acrylamides; vinyl fluoride; and allyl acetate.

Preferred vinyl alcohol polymers are partially and completely hydrolyzed vinyl alcohol polymers produced commercially by partial or complete hydrolysis of polyvinyl acetate. Extent of hydrolysis of acetate groups can range from about 80 mole % to about 100 mole %. The preferred vinyl alcohol polymers are most commonly available commercially.

The cationic melamine-formaldehyde resin component of this invention is a cationic methylol melamine formed by condensing melamine with formaldehyde in mole ratios of from about ½ to about ⅓ melamine/formaldehyde, followed by treatment with an acid in aqueous solution. The resulting cationic methylol melamine commonly is called a methylol melamine resin acid colloid. It is a very low molecular weight polymer or oligomer, (molecular weight of from about 900 to about 4400). The resin acid colloid is positively charged through protonation of nitrogen groups by the acid. Also suitable for use in this invention is a methylol melamine resin which has been alkylated by reaction with methanol before or during conversion to the acid colloid form. A typical preparative scheme for a methylated methylol melamine resin is given in "Amino Resins", Reinhold Publishing Corporation, 1959.

A detailed discussion of melamine-formaldehyde resin acid colloids is given in TAPPI Monograph Series No. 29, "Wet Strength in Paper and Paperboard", pp. 20-32, Tech. Assoc. of the Pulp and Paper Industry, NYC, 1965. A typical preparation involves dissolving trimethylolmelamine in water containing hydrochloric acid (about 0.8 mole HCl per mole of trimethylolmelamine), followed by aging for at least one hour at room temperature. Mole ratio of hydrochloric acid/trimethylolmelamine can range from about 0.6/1.0 to 1.0/1.0. Alternate useful acids include acetic, phosphoric, and lactic acids. The preferred acid is hydrochloric acid. Also useful in the present invention are so-called "high efficiency" colloids, in which 1 to 7 moles of extra formaldehyde per mole of trimethylol melamine are included with acid colloid formation. A trimethylolmelamine acid colloid without added formaldehyde is preferred in the present invention.

Preferred cationic melamine-formaldehyde resins are those produced from trimethylolmelamine and made cationic with hydrochloric acid, as described in the preceding two paragraphs.

The amount of vinyl alcohol polymer adsorbed onto the filler can range from about 0.01% to 3%, based on dry filler weight, preferably from about 0.02 to about 2.5%.

The weight ratio of vinyl alcohol polymer to cationic melamine-formaldehyde resin can range from about 0.3:1 to about 8:1. The preferred ratio is from about 0.5:1 to about 2:1. Cationic melamine-formaldehyde resin adsorbed onto the filler can range from about 0.01% to about 3.0%, based on dry filler weight, with from about 0.02% to about 2.5% being preferred.

Formation of the modified filler of this invention may be accomplished by treating the filler first with aqueous solution of vinyl alcohol polymer, followed by treatment with aqueous colloidal dispersion of cationic melamine-formaldehyde resin. Alternatively, the filler can first be treated with aqueous colloidal dispersion of cationic melamine-formaldehyde resin, followed by treatment with aqueous vinyl alcohol polymer solution.

Another method of forming the modified filler of this invention is to treat the filler with aqueous polyvinyl alcohol/cationic melamine-formaldehyde interaction product in one step. Preparation of the latter interaction products is described in copending patent application Ser. No. 323,053, filed Nov. 19, 1981, now U.S. Pat. No. 4,461,858 titled "Polyvinyl Alcohol/Melamine-Formaldehyde Interaction Products", the disclosure of which is hereby incorporated by reference. Any of these filler treatments involve adsorption, step-wise or concurrently, of vinyl alcohol polymer and melamine-formaldehyde resin onto the filler surface from aqueous medium. Treatment of the filler with the two components can be conducted at ambient temperature, which is preferred for convenience. Higher temperatures, not exceeding the boiling point of water (100° C. at atmospheric pressure), can also be used, however. Filler treatment times can range from about 1 minute to about 1 hour, with from about 5 to about 30 minutes being preferred. In order to achieve some degree of adsorption uniformity, some form of agitation or mixing preferably should be used during surface modification of the filler with vinyl alcohol polymer and melamine-formaldehyde resin. The products of this invention can be used in slurry form, if desired, or could be separated and dried for subsequent use.

The products of this invention can be used in the conventional methods of preparing paper sheets and other cellulosic products containing inert mineral fillers. In a typical commercial papermaking process, an aqueous suspension of cellulose fibers is conducted through mechanical beating and refining operations to break up fibrous bundles, reduce fiber lengths, and fibrillate fiber surfaces. The resulting suspension commonly is called the stock or furnish. It is pumped to a headbox for controlled distribution onto the surface of a moving screen where paper formation takes place. During formation, much of the suspension water phase is removed downward through the screen openings, while much of the fibrous phase remains on the screen surface. Additional water is removed as the formed wet paper is led through a series of cylindrical presses and hot dryers. Any inert mineral filler to be incorporated into the paper may be added generally anywhere in the wet suspension phase of a process prior to paper formation. Filler also may be incorporated by application of an aqueous filler slurry or dispersion onto the surface of formed, partially dried paper. The products of this invention are applicable at any of the filler addition points commonly used and familiar to one skilled in the art. Among the variety of cellulosic pulps to which the products of this invention are applicable are bleached and unbleached sulfate (kraft), bleached and unbleached sulfite, semichemical, groundwood, or blends of these pulps. Inert filler content in a paper product generally can be from about 3% to over 30%, preferably from about 8% to about 20%. Although filler often enhances paper printability and paper properties such as opacity and smoothness, filler also generally weakens paper and reduces properties such as tensile strength.

The following Examples serve to illustrate the present invention. All parts and percentages are by weight unless otherwise indicated.

EXAMPLES 1 TO 14 AND COMPARATIVE EXAMPLES 1 TO 14

The following inorganic fillers were treated in 10% solids aqueous slurries with polyvinyl alcohol (PVA) or with a 1/1 (weight ratio) polyvinyl alcohol/cationic trimethylolmelamine acid colloid interaction product (PVA/TMM): hydrated clay, calcined clay, calcium carbonate ("Atomite", No. 9 "Whiting"), wollastonite ("NYAD"-G, "PMF") and silica ("HI-SIL"-215). At ambient temperature, 2.0 grams of filler was agitated in 18.0 grams total of water for thirty minutes after adding the surface treatment material in a portion of the water. The aqueous phase then was separated from the filler by filtration, and a portion of the aqueous phase was analyzed for polyvinyl alcohol colorimetrically [J. L. Finley, Anal. Chem., Vol. 33, No. 13, 1925 (1961)]. This method involves absorption of a polyvinyl alcohol/iodine/boric acid colored complex at 660 nanometers. Amount of polyvinyl alcohol adsorbed onto the filler surface was calculated by difference from the initial charge. Results are summarized in Table I.

TABLE I

| Example | Filler | Treatment | mg. PVA Charged | mg. PVA on Filler |
|---|---|---|---|---|
| C 1 | Hydrated Clay | PVA | 5.0 | 4.6 |
| C 2 | Hydrated Clay | PVA | 10.0 | 7.2 |
| 1 | Hydrated Clay | PVA/TMM | 5.0 | 5.0 |
| 2 | Hydrated Clay | PVA/TMM | 10.0 | 10.0 |
| C 3 | "Atomite" | PVA | 5.0 | 3.8 |
| C 4 | "Atomite" | PVA | 10.0 | 6.2 |
| 3 | "Atomite" | PVA/TMM | 5.0 | 4.6 |
| 4 | "Atomite" | PVA/TMM | 10.0 | 7.0 |
| C 5 | Calcined Clay | PVA | 5.0 | 4.5 |
| C 6 | Calcined Clay | PVA | 10.0 | 7.8 |
| 5 | Calcined Clay | PVA/TMM | 5.0 | 4.7 |
| 6 | Calcined Clay | PVA/TMM | 10.0 | 9.6 |
| C 7 | No. 9 "Whiting" | PVA | 5.0 | 1.7 |
| C 8 | No. 9 "Whiting" | PVA | 10.0 | 2.0 |
| 7 | No. 9 "Whiting" | PVA/TMM | 5.0 | 2.7 |
| 8 | No. 9 "Whiting" | PVA/TMM | 10.0 | 5.0 |
| C 9 | Wollastonite ("NYAD"-G) | PVA | 5.0 | 0 |
| C 10 | Wollastonite ("NYAD"-G) | PVA | 10.0 | 1.0 |
| 9 | Wollastonite ("NYAD"-G) | PVA/TMM | 5.0 | 2.6 |
| 10 | Wollastonite ("NYAD"-G) | PVA/TMM | 10.0 | 5.2 |
| C 11 | Silica ("HI-SIL-215") | PVA | 5.0 | 4.4 |
| C 12 | Silica ("HI-SIL-215") | PVA | 10.0 | 6.0 |
| 11 | Silica ("HI-SIL-215") | PVA/TMM | 5.0 | 4.9 |
| 12 | Silica ("HI-SIL-215") | PVA/TMM | 10.0 | 7.5 |
| C 13 | Wollastonite ("PMF") | PVA | 5.0 | 0.2 |
| C 14 | Wollastonite ("PMF") | PVA | 10.0 | 0.3 |
| 13 | Wollastonite ("PMF") | PVA/TMM | 5.0 | 2.5 |
| 14 | Wollastonite ("PMF") | PVA/TMM | 10.0 | 4.4 |

The results show that extent of adsorption of PVA onto fillers is enhanced when the PVA is added in conjunction with cationic TMM as a 1/1 interaction product.

The polyvinyl alcohol utilized in these experiments was a fully hydrolyzed (99.0 mole %), medium molecular weight (30 mPa·s 4% aqueous solution viscosity at 20° C.) grade. The 1/1 PVA/TMM interaction product was prepared by the general method described in copending patent application Ser. No. 323,053, filed Nov. 19, 1981. Briefly, a 12.0% solids colloidal dispersion of trimethylolmelamine acid colloid in water was prepared from commercial "Parez" 607 trimethylolmelamine and hydrochloric acid, using a 1.0/0.8 mole ratio of trimethylolmelamine/HCl. This was diluted to 6.0% solids for use. A hot 2.0% solids solution of PVA was prepared by slurrying the PVA and then heating to about 90° C. Then, the 6.0% TMM was added to the hot PVA solution and was mixed for 15 minutes at about 65° C. The resulting 3.0% solution of 1/1 PVA/TMM was diluted to 0.5% solids for use in the experiments.

EXAMPLES 15 TO 18 AND COMPARATIVE EXAMPLE 15

Clay (Georgia Kaolin WP-SD) was treated in 10% slurries in water (5.0 grams in 45 grams water) for 30 minutes with PVA of Examples 1-14, and then for 30 minutes with cationic TMM (prepared as in Examples 1-14). Based on clay weight, 4.0% PVA was added to the slurry in each experiment, while percent TMM was varied. Colorimetric analysis and calculation of amounts of PVA adsorbed on filler was accomplished as in Examples 1-14. The effect of TMM upon enhancing PVA adsorption onto filler is shown in Table II.

TABLE II

| Example | % TMM Charged | mg. PVA in Aqueous Phase | mg. PVA on Clay |
|---|---|---|---|
| C 15 | 0 | 171.0 | 29.0 |
| 15 | 0.5 | 158.4 | 41.6 |
| 16 | 1.0 | 149.5 | 50.5 |
| 17 | 2.0 | 117.9 | 82.1 |
| 18 | 4.0 | 72.0 | 128.0 |

The PVA/TMM weight ratio ranges from 8/1 to 1/1 in these experiments.

EXAMPLES 19 TO 30 AND COMPARATIVE EXAMPLES 16 TO 22

Clay (commercially available as "Hi-White") was treated in 10% slurries in water with polyvinyl alcohol (PVA) in one of three ways. In Method #1, PVA alone was added to the slurry. Method #2 involved treatment of the filler with PVA for 30 minutes, followed by treatment of the filler with cationic trimethylolmelamine acid colloid (TMM) for an additional 30 minutes at ambient temperature. Preparation of the TMM is described in Examples 1-14. In Method #3, filler slurry was first treated with cationic TMM for 30 minutes, and then with PVA for an additional 30 minutes. In all cases, 5.0 grams of clay was treated in 45 grams water with moderate agitation in a beaker. A "control" clay slurry similarly was prepared without treatment.

The clay slurries were used for papermaking in a Woods & Noble handsheet mold. The papermaking furnish consisted of a 65/35 (weight ratio) hardwood/softwood bleached kraft pulp, 20% clay charge, 1.0% alum (aluminum sulfate), 0.25% rosin sizing (commercially, "Pexol"), and 0.027% of a cationic polyacrylamide retention aid (commercially, "Accurac 135"), all percents based on pulp dry weight. The furnish was beatened in a blender, the paper was formed on the mold, and was dried between blotting and filter papers at 115° C. for 20 minutes. Paper strip samples were tested for tensile strength, expressed in papermakers' language as dry breaking length. Amount of PVA on filler was determined colorimetrically by difference, as in Examples 1-14. Gravimetric determination of paper filler content by ashing at 500° C., coupled with the results for PVA adsorbed onto the filler, provided values for percent PVA in paper from incorporated filler. The effect of this PVA upon paper strength is shown in Table III.

TABLE III

| Example | Method | % Charged PVA | % Charged TMM | % Ash in Paper | % PVA in Paper | Dry Break Length, m |
|---------|--------|---------------|---------------|----------------|----------------|---------------------|
| C 16 | — | 0 | 0 | 13.0 | 0 | 652 |
| C 17 | #1 | 0.08 | 0 | 11.7 | 0.010 | 872 |
| C 18 | #1 | 0.16 | 0 | 12.5 | 0.024 | 923 |
| C 19 | #1 | 0.32 | 0 | 11.9 | 0.046 | 1021 |
| C 20 | #1 | 0.64 | 0 | 12.0 | 0.088 | 1015 |
| C 21 | #1 | 1.28 | 0 | 11.3 | 0.084 | 1288 |
| C 22 | #1 | 2.56 | 0 | 11.8 | 0.139 | 1146 |
| 19 | #2 | 0.08 | 0.08 | 11.9 | 0.011 | 985 |
| 20 | #2 | 0.16 | 0.16 | 12.4 | 0.024 | 1047 |
| 21 | #2 | 0.32 | 0.32 | 12.8 | 0.049 | 1065 |
| 22 | #2 | 0.64 | 0.64 | 12.5 | 0.096 | 1158 |
| 23 | #2 | 1.28 | 1.28 | 11.9 | 0.178 | 1392 |
| 24 | #2 | 2.56 | 2.56 | 10.5 | 0.262 | 1448 |
| 25 | #3 | 0.08 | 0.08 | 12.5 | 0.012 | 920 |
| 26 | #3 | 0.16 | 0.16 | 12.9 | 0.025 | 859 |
| 27 | #3 | 0.32 | 0.32 | 11.5 | 0.044 | 856 |
| 28 | #3 | 0.64 | 0.64 | 11.5 | 0.088 | 1274 |
| 29 | #3 | 1.28 | 1.28 | 12.5 | 0.183 | 1202 |
| 30 | #3 | 2.56 | 2.56 | 10.9 | 0.250 | 1367 |

The results show enhancement of percent PVA adsorbed onto filler, hence present in the paper, by cotreatment with cationic TMM, and also illustrate the strengthening effect of PVA so incorporated.

I claim:

1. A modified filler prepared by contacting inert, particulate, mineral filler with aqueous solution of vinyl alcohol polymer and aqueous colloidal dispersion of cationic melamine-formaldehyde resin sequentially, in either order, or concurrently in one step by use of preformed aqueous vinyl alcohol polymer/cationic melamine-formaldehyde interaction product, the weight ratio of vinyl alcohol polymer to cationic melamine-formaldehyde resin being from about 0.3:1 to about 8:1, at a temperature of up to about 100° C. for a period of from about 1 minute to about 1 hour, to obtain a filler having adsorbed thereon from about 0.01 to about 3%, based on dry filler weight, of each of vinyl alcohol polymer and cationic melamine-formaldehyde resin.

2. The modified filler of claim 1 wherein the vinyl alcohol polymer is selected from the group consisting of polyvinyl alcohol and copolymers of vinyl alcohol with up to about 15 mole percent of other comonomer selected from the group consisting of α-olefins having 2 to 18 carbon atoms, vinyl esters of saturated carboxylic acids wherein the acid moiety has up to 18 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, N-substituted amides of unsaturated monocarboxylic acids, allyl alcohol, allyl esters of saturated carboxylic acids wherein the acid moiety has up to 18 carbon atoms and vinyl halides.

3. The modified filler of claim 2 wherein the filler is selected from the group consisting of silicates, oxides, carbonates and sulfates.

4. The modified filler of claim 3 wherein the filler and vinyl alcohol polymer and cationic melamine-formaldehyde resin are contacted with agitation.

5. The modified filler of claim 4 wherein the filler is selected from the group consisting of clay and calcium carbonate.

6. The modified filler of claim 5 wherein the vinyl alcohol polymer is selected from the group consisting of partially and completely hydrolyzed polyvinyl acetate wherein the extent of hydrolysis is from about 80 to about 100 mole %.

7. The modified filler of claim 6 wherein the cationic melamine-formaldehyde resin is trimethylolmelamine which has been oligomerized and made cationic with from about 0.6 to about 1.0 mole hydrochloric acid per mole trimethylolmelamine.

8. The modified filler of claim 7 wherein the filler is contacted with vinyl alcohol polymer and the cationic melamine-formaldehyde resin at room temperature for a period of from about 5 to about 30 minutes.

9. The modified filler of claim 8 wherein the ratio of vinyl alcohol polymer to cationic melamine-formaldehyde resin is from about 0.5:1 to about 2:1.

10. The modified filler of claim 9 wherein from about 0.02 to about 2.5%, based on dry filler weight, of each of vinyl alcohol polymer and cationic melamine-formaldehyde resin is adsorbed on the filler.

* * * * *